United States Patent
Albou et al.

(10) Patent No.: US 10,501,010 B2
(45) Date of Patent: Dec. 10, 2019

(54) MOTOR VEHICLE LIGHTING MODULE CONFIGURED TO PROJECT A LIGHT BEAM FORMING A PIXELIZED IMAGE

(71) Applicant: VALEO VISION, Bobigny (FR)

(72) Inventors: Pierre Albou, Bobigny (FR); Vincent Godbillon, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/964,716

(22) Filed: Apr. 27, 2018

(65) Prior Publication Data

US 2018/0312104 A1 Nov. 1, 2018

(30) Foreign Application Priority Data

Apr. 28, 2017 (FR) ..................... 17 53784

(51) Int. Cl.
| | | |
|---|---|---|
| B60Q 1/38 | (2006.01) | |
| G01C 21/36 | (2006.01) | |
| F21S 41/64 | (2018.01) | |
| G09G 3/34 | (2006.01) | |

(Continued)

(52) U.S. Cl.
CPC .............. B60Q 1/38 (2013.01); F21S 41/153 (2018.01); F21S 41/155 (2018.01); F21S 41/25 (2018.01);

(Continued)

(58) Field of Classification Search
CPC ...... F21S 41/675; F21S 41/645; F21S 41/153; F21S 41/663; F21S 41/25; B60Q 1/38; B60Q 2400/50; G01C 21/365; G09G 3/3426; G09G 3/346; H04N 9/3188; H04N 9/3138

See application file for complete search history.

(56) References Cited

U.S. PATENT DOCUMENTS 3,611,359 A * 10/1971 Panerai ................ G02B 6/0006
200/DIG. 47
6,497,503 B1 * 12/2002 Dassanayake ......... B60Q 1/085
362/465

(Continued)

FOREIGN PATENT DOCUMENTS

FR 3 041 112 3/2017
WO WO 2017/025445 A1 2/2017

OTHER PUBLICATIONS

French Preliminary Search Report dated Jan. 17, 2018 in French Application 17 53784, filed on Apr. 28, 2017 (with English Translation of Categories of cited documents).

*Primary Examiner* — Sang H Nguyen
(74) *Attorney, Agent, or Firm* — Oblon, McClelland, Maier & Neustadt, L.L.P.

(57) ABSTRACT

A lighting module for a motor vehicle, configured to project a light beam forming a pixelized image. The lighting module includes a light source and a device for processing the light emitted by the light source includes a matrix of active elements configured to process at least a portion of the light beam emitted by the light source in such a manner as to form the pixelized image. The light source includes a matrix of emissive elements of which at least two emissive elements can be activated selectively and the matrix of emissive elements and of active elements are offset relative to one another in such a manner that each active element is arranged across a portion of the light beam emitted by an emissive element.

20 Claims, 3 Drawing Sheets

(51) Int. Cl.
  *G09G 3/36* (2006.01)
  *H04N 9/31* (2006.01)
  *F21S 41/153* (2018.01)
  *F21S 41/155* (2018.01)
  *F21S 41/25* (2018.01)
  *F21S 41/663* (2018.01)
  *F21S 41/675* (2018.01)

(52) U.S. Cl.
  CPC ............ *F21S 41/645* (2018.01); *F21S 41/663* (2018.01); *F21S 41/675* (2018.01); *G01C 21/365* (2013.01); *G09G 3/346* (2013.01); *G09G 3/3426* (2013.01); *G09G 3/364* (2013.01); *H04N 9/3126* (2013.01); *H04N 9/3138* (2013.01); *H04N 9/3188* (2013.01); *B60Q 2400/50* (2013.01); *G09G 2300/023* (2013.01); *G09G 2340/0457* (2013.01)

(56) References Cited

U.S. PATENT DOCUMENTS

| | | | |
|---|---|---|---|
| 2004/0114921 A1* | 6/2004 | Braun | B60Q 9/008 396/661 |
| 2005/0134527 A1* | 6/2005 | Ouderkirk | A61C 19/004 345/32 |
| 2006/0209270 A1* | 9/2006 | Suzuki | G03B 21/2013 353/98 |
| 2008/0198372 A1 | 8/2008 | Pan | |
| 2013/0258689 A1* | 10/2013 | Takahira | F21V 14/00 362/465 |
| 2013/0265561 A1* | 10/2013 | Takahira | F21V 7/06 356/3 |
| 2015/0285458 A1* | 10/2015 | Dassanayake | B60Q 1/085 362/466 |
| 2017/0038582 A1* | 2/2017 | Chau | G02B 27/0101 |

* cited by examiner

MOTOR VEHICLE LIGHTING MODULE CONFIGURED TO PROJECT A LIGHT BEAM FORMING A PIXELIZED IMAGE

BACKGROUND

Field of the Invention

The technical field of the invention is that of motor vehicle lighting. It more particularly concerns a lighting module adapted to project a pixelized image and its integration into a motor vehicle headlight.

Description of the Related Art

Motor vehicles are equipped with projection devices, of headlight or headlamp type, intended to illuminate the road in front of the vehicle at night or under low light conditions by means of an overall light beam. These headlights, a left-hand headlight and a right-hand headlight, respectively include one or more lighting modules adapted to generate and to direct a partial light beam the addition whereof forms said overall light beam.

Over and above these statutory lighting functions, indispensable for the safety of all road users, motor vehicle manufacturers and original equipment manufacturers aim to propose devices facilitating driving and in particular presenting information relating to the status of the vehicle, the detection of an emergency situation or the presentation of navigation information. For example, lighting modules for projecting information onto the road scene have been developed in order to avoid the driver having to look away from the road scene to view this information. To be more precise, these lighting modules are configured to project information ahead of the vehicle relative to its direction of forward movement in the case of information to be viewed by the occupants of the vehicle or behind the vehicle in the case of information to be viewed by the occupants of a following vehicle. The information to be viewed is projected onto the road in the form of a pixelized image taking the form of an easily understood pictogram, for example an arrow, if the satellite navigation device associated with the vehicle detects an upcoming turn or an exclamation point if an emergency situation involves rapid immobilization of the vehicle, etc.

Figure 1:
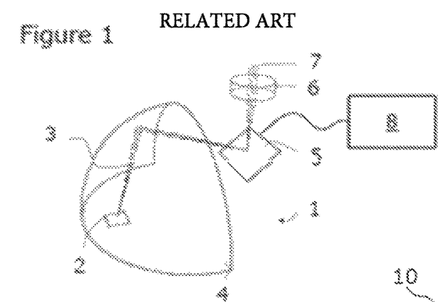
FIG. 1 is a diagrammatic representation of a lighting module configured to project a pixelized image.

FIG. 1 shows one example of a digital micromirror device (DMD) type lighting module 1 configured to project a light beam forming a pixelized image. To this end, the lighting module includes a light source 2 emitting a light beam 3 in the direction of a reflector 4 configured to deflect the rays of the beam toward a matrix 5 of micromirrors. The light source is disposed in the vicinity of the image focus of the reflector and the micromirror matrix is disposed in the vicinity of the image focus of said reflector, with the result that the rays reflected by the reflective internal surface of the reflector are concentrated on the micromirror matrix 5, illuminating all of the micromirrors. The micromirror matrix comprises mirrors rotatable independently of one another. By way of nonlimiting example, the micromirror matrix 5 is of square shape and delimited by 500 to 800 mirrors on each of its sides, each mirror being able to have a size of the order of 7 to 10 micrometres. To be more precise, each micromirror is mounted to pivot about an axis between an active position in which the micromirror reflects the incident light beam in the direction of the projection optical system and a passive position in which the micromirror reflects the incident light beam in the direction of a luminous radiation absorber element that is not shown in FIG. 1. Once reflected by at least some of the micromirrors, the light beam passes through a dioptre 6 of the lighting module 1 in order to project the light beam.

This lighting module 1 enables provision at the exit from the dioptre 6 of a high-resolution pixelized and digitized light beam 7 that forms all or part of the pixelized image that it is intended to project onto the road scene. Each pixel or pixelized ray constituting this light beam 7 corresponds to a portion of the original beam 3 deflected by a micromirror and it is then possible to activate or not these micropixels by controlling each micromirror by means of a control module 8. This particular feature then makes it possible to design any required shape of the light beam 7 at the exit of the dioptre 6 in accordance with the requirements for marking on the road, and in particular to represent a pictogram on the projected area ahead of the vehicle. A DMD type lighting module as described above thus enables the projection of pixelized images onto the road.

The resolution of the pixelized images depends on the number of controllable micromirrors. The mechanisms employed to pivot the micromirrors are sensitive to vibrations and to variations of temperature and clearly the use of a matrix of mobile micromirrors is increasingly fragile as the number of micromirrors increases relative to the size of the matrix, that size being itself limited by the cost of the component. The use of very high resolution DMD type devices in motor vehicle headlights is therefore difficult at present because of the high risk of breakage of the micromirror pivoting mechanisms.

The present invention falls within this context and aims to propose a motor vehicle lighting module that enables the projection of pixelized images with a number of active elements, of the micromirror type described above, that is reduced in order to reduce the unit cost and/or to limit the risk of malfunctions.

BRIEF SUMMARY

To this end, the invention proposes a lighting module for a motor vehicle, configured to project a light beam forming a pixelized image. The lighting module comprises a light source and a device for processing the light emitted by the light source. To be more precise, the processing device includes a matrix of active elements configured to process at least a portion of the light beam emitted by the light source in such a manner as to form the pixelized image. By "active element" is meant here a surface adapted to transmit at least partly the light that illuminates it in the direction of a required scene, for example a road scene, when the active element is activated.

The invention is characterized in that the light source includes a matrix of emissive elements of which at least two emissive elements can be activated selectively and in that the matrix of emissive elements and the matrix of active elements are offset relative to one another in such a manner that each active element is arranged across a portion of the light beam emitted by an emissive element.

By "across a portion of the light beam" is meant that each active element is located across only a portion of the beam emitted by the emissive element, i.e. that each active element is impacted only by this portion of the beam emitted by the emissive element, whether that be in order to reflect or to refract the rays. The rest of the rays forming this light beam emitted by an emissive element are directed to the exterior of the active element matrix or to another active element of that matrix. Therefore, when an active element is activated and illuminated by a single emissive element, the active element transmits a portion of the light beam emitted by said emissive element. The transmitted light beam is then projected onto a required scene, forming a pixel. Clearly the light beam from an emissive element illuminates only a portion of the surface of an active element. Accordingly, to illuminate the entire surface of an active element, it is necessary to activate at least two emissive elements. Because of this, if the same active element is activated and illuminated by a plurality of emissive elements, the active element transmits a plurality of portions of light beams emitted by the emissive elements. The transmitted light beams then form a plurality of pixels of the pixelized image. It is therefore clear that it is possible to form at least two pixels of a pixelized image by activating only one active element. Because of this, thanks to the invention, activating a single active element can enable the formation of one or more pixels by activating one or more emissive elements, each emissive element partially lighting the active element. Accordingly, compared to a prior art device as described above, for identical image resolution, the invention advantageously enables use of fewer micromirrors, which enables a smaller processing device to be provided, which is therefore less costly, or larger micromirrors to be used, which enables the reliability of these active elements to be increased.

In other words, it is clear that the matrices are offset in that in each matrix the elements that constitute it are separated by lines of demarcation and that, given the matrix of active elements of the processing device and the image of the matrix of emissive elements of the source as projected onto the matrix of active elements of the processing device, the lines of demarcation are not superposed.

According to one feature of the invention, each emissive element may be configured to illuminate at least two adjacent active elements. Each emissive element is preferably configured to illuminate at least four adjacent active elements. Concomitantly, each active element is configured to be illuminated by at least four emissive elements. Clearly increasing the number of emissive elements for illuminating the whole of an active element increases the number of pixels that the active element can form in the image. In other words, for an image with the same resolution, the number of active elements to form said image is reduced.

According to another feature of the invention, the surface area of the matrix of emissive elements may be greater than the surface area of the matrix of active elements. This ensures that each active element delimiting the edges of the matrix has its surface entirely illuminated by a plurality of emissive elements.

According to another feature, the surface area of at least one emissive element may be equal to the surface area of at least one active element. The surface areas of the emissive elements and of the active elements are preferably identical in order to facilitate optical alignment between the matrix of emissive elements and the matrix of active elements, with a constant offset between the emissive elements and the active elements.

Clearly, in the preceding two features, the surface area comparison may be effected between a projected surface area of the at least one emissive element onto the matrix of active elements and the surface area of the at least one active element provided that the emissive element is projected with a specific magnification. This enables the size of the light sources to be minimized.

According to another feature, the surface area of projection onto the processing device of a light beam emitted by an emissive element may be equal to the surface area of at least one active element.

According to another feature, the lighting module may comprise a first projection optic arranged to face the matrix of active elements in such a manner as to project the pixelized image to the outside of the device. The projection optic comprises at least one optical element such as one or more lenses, one or more reflectors, one or more light guides, or a combination of the above. Each of the cited optical elements could have varied shapes.

According to another feature, at least one active element may reflect a portion of the light beam emitted by an emissive element. According to a preferred embodiment, the matrix of active elements may comprise a plurality of rotatable DMD type micromirrors. In this case, the projection optic and the light source may be placed on the same side of the processing device.

According to another feature, at least one active element may be configured to refract a portion of the light beam emitted by an emissive element. At least one active element may take the form of a liquid crystal. In particular, the matrix of active elements may form an LCD type screen. In this case, the projection optic and the light source may be placed on respective opposite sides of the processing device. According to an alternative embodiment, the light source may then adjoin the processing device.

According to another feature, the lighting module comprises a second projection optic arranged between the light source and the processing device in such a manner as to project onto the matrix of active elements at least a portion of the light emitted by the light source. The projection optic comprises at least one optical element such as one or more lenses, one or more reflectors, one or more light guides, or a combination of the above. Each of the cited optical elements could have varied shapes.

According to another feature, the lighting module may comprise a control module configured to control simultaneously the lighting and/or the extinction of the emissive elements and the configuration of the active elements of the processing device. By "control ( . . . ) the configuration of the active elements" is meant the possibility for the control module to pivot one or more mobile micromirrors when the matrix of active elements is of DMD type or to modify the transmittance of one or more liquid crystal cells when the matrix of active elements is an LCD type screen.

According to another feature, each emissive element may comprise one or more submillimetre size electroluminescent rods for emitting a light beam.

Thus there is applied in the automotive field a technology consisting in producing the electroluminescent part by means of a plurality of electroluminescent rods that are grown on a substrate to produce a three-dimensional topology. Clearly that three-dimensional topology has the advantage of multiplying the light emitting surface area compared to the light-emitting diodes known previously in the automotive field, namely substantially plane diodes. As a result, it is possible to produce very bright light at lower unit cost.

The fact that the emissive elements, and in particular in this case the electroluminescent rods, can be activated selectively, making it possible for at least two emissive elements of the light source to be arranged to be illuminated selectively, and the fact that there is provided a module for controlling lighting separate from these emissive elements, enabling lighting or extinguishing of the emissive element separately from one another each, simultaneously or not, enables the production of pixelized light that is able to evolve as a function of the pixelized image that it is wished to project.

The electroluminescent rods may project from a substrate and may in particular be formed directly on that substrate. The substrate may be based on silicon or silicon carbide. Clearly the substrate is based on silicon when it contains mostly silicon, for example at least 50% and in practice approximately 99%.

According to a series of features specific to the structure of the electroluminescent rods and to the disposition of those electroluminescent rods of the substrate, considered separately or in combination with the others:

- each rod has a cylindrical general shape, notably of polygonal section; each rod could have the same general shape, and in particular a hexagonal shape;
- each of the rods is delimited by a terminal face and by a circumferential wall that extends along a longitudinal axis of the rod defining its height, light being emitted at least from the circumferential wall; light could equally be emitted by the terminal face;
- each rod may have a terminal face substantially perpendicular to the circumferential wall and in different variants this terminal face may be substantially plane or convex or pointed at its centre;
- the rods are arranged in a two-dimensional matrix, whether that matrix is regular, with a constant spacing between two successive rods of a given alignment, or the rods are disposed in a quincunx;
- the height of a rod is between 1 and 10 micrometres inclusive;
- the largest dimension of the terminal face is less than 2 micrometres;
- the distance that separates two immediately adjacent rods is 2 micrometres minimum and 100 micrometres maximum.

According to other features, the semiconductor light source comprising a plurality of submillimetre size electroluminescent rods could further include a layer of a polymer material forming an encapsulation in which the rods are at least partly embedded; an encapsulation of this kind is deposited on the substrate, covering the rods, and it is advantageous for the encapsulation to extend at least as far as to cover the highest rod. This polymer material may be based on silicone, it being understood that the polymer material is based on silicone if it includes mostly silicone, for example at least 50% and in practice approximately 99%. The layer of polymer material may comprise a luminophore or a plurality of luminophores excited by the light generated by at least one of the plurality of rods. By luminophore, or light converter, is meant the presence of at least one electroluminescent material designed to absorb at least a portion of excitation light emitted by a light source and to convert at least a portion of said absorbed excitation light into emitted light having a wavelength different from that of the excitation light. This luminophore or this plurality of luminophores may be at least partially embedded in the polymer or disposed on the surface of the layer of polymer material.

Alternatively, according to another feature, each emissive element may comprise one or more submillimetre size electroluminescent studs for emitting a light beam. The studs are formed by epitaxial growth, in particular of an n-doped GaN first layer and a p-doped GaN second layer, for example of silicon carbide, the whole being cut (by grinding and/or ablation) to form a plurality of pixels originating from the same substrate. The result of a design of this kind is a plurality of electroluminescent blocks all produced form the same substrate and electrically connected to be activated selectively from one another. The single substrate may have a thickness between 100 µm and 800 µm inclusive, in particular equal to 200 µm; each block may have a width and a length, each between 50 µm and 500 µm inclusive, preferably between 100 µm and 200 µm inclusive. In a variant, the length and the widths are equal. The height of each block is less than 500 µm, preferably less than 300 µm. Finally, the exit surface of each block may be on the substrate on the side opposite the epitaxial growth. The separation distance between two adjacent pixels may be less than 1 mm, in particular less than 500 µm, and is preferably less than 100 µm, and even more preferably less than 20 µm.

The fact that the emissive elements, and in particular in this case the electroluminescent studs, can be activated selectively, making it possible for at least two emissive elements of the light source to be arranged to be illuminated selectively, and the fact that there is provided a lighting control module distinct from these emissive elements, making it possible to light or to extinguish each emissive element separately from the others, and either simultaneously or not, enables the production of pixelized light that may evolve as a function of the pixelized image that it is wished to project.

The invention also concerns a motor vehicle lighting device including at least one of the lighting modules described above. That lighting device may consist in a headlight, a rear light, or an interior lighting system. The invention also concerns a motor vehicle including a headlight of this kind.

Of course, the features, variants and different embodiments of the invention may be associated with one another in various combinations provided that they are not incompatible or mutually exclusive.

BRIEF DESCRIPTION OF THE SEVERAL VIEWS OF THE DRAWINGS

Other features and advantages of the present invention will become more clearly apparent in the light of the description and the drawings, in which.

DETAILED DESCRIPTION

It must be remembered that the invention proposes a lighting module for a motor vehicle, configured to project a light beam forming a pixelized image on a road scene. The lighting module 10, described hereinafter, comprises a control module 101, a light source 102 controlled by the control module, and a device 200 for processing light emitted by the light source and also controlled by the control module 101.

Figure 2:
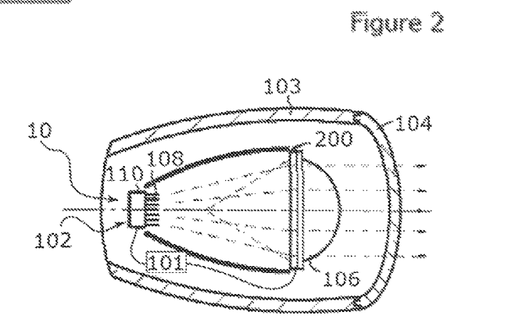
FIG. 2 is a side view of a lighting module according to the invention in which is shown a semiconductor light source facing a device for processing the light emitted by the light source.

As shown in FIG. 2, the lighting module 10 is accommodated in a lighting device, here a motor vehicle headlight, formed of a housing 103 closed by an outer lens 104. According to the present example, the lighting module 10 comprises a first optic 106 for shaping at least some of the light rays emitted by a light source 102. The first optic 106 is configured to change the direction of at least some of the light rays emitted by the light source 102.

The light source 102 is a semiconductor source comprising emissive elements and more particularly submillimetre size electroluminescent rods, i.e. three-dimensional semiconductor sources to be described hereinafter, in contrast to the conventional two-dimensional sources, resembling substantially plane sources because of their thickness of the order of a few nanometres whereas a source with electroluminescent rods has a height at least equal to one micrometre.

Figure 3:
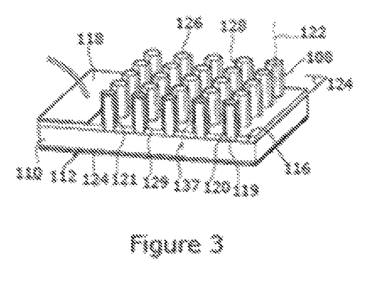
FIG. 3 is a diagrammatic representation in perspective of the semiconductor light source from FIG. 2 including a plurality of electroluminescent rods projecting on a substrate in which there has been made visible in section a row of electroluminescent rods.

As shown in FIG. 3, the light source 102 comprises a plurality of submillimetre size electroluminescent rods 108 referred to hereinafter as electroluminescent rods. These electroluminescent rods 108 originate from the same substrate 110. Each electroluminescent rod, formed here using gallium nitride (GaN), projects perpendicularly or substantially perpendicularly from the substrate, based here on silicon, although other materials such as silicon carbide may be used without departing from the context of the invention. For example, the electroluminescent rods could be made from an alloy of aluminium nitride and gallium nitride (AlGaN) or from an alloy of aluminium, indium and gallium (AlInGaN).

The substrate no has a lower face 112 on which a first electrode 114 is mounted and an upper face 116 from which the electroluminescent rods 108 extend and on which a second electrode 118 is mounted. Various layers of materials are superposed on the upper face 116, in particular after the growth, here the upward growth, of the electroluminescent rods on the substrate. Among these various layers there may be found at least one layer of electrically conductive material in order to enable the supply of electrical power to the rods. This layer is etched in such a manner as to connect together some of the rods, the lighting of those rods then being commandable simultaneously by a control module, not shown here. At least two electroluminescent rods or at least two groups of electroluminescent rods of the semiconductor light source could be arranged to be lit distinctly by means of a lighting control system.

The submillimetre size electroluminescent rods extend from the substrate and each includes, as can be seen in FIG. 3, a gallium nitride core 119 around which are disposed quantum wells 120 formed by a radial superposition of layers of different materials, here gallium nitride and gallium-indium nitride, and a shell 121 surrounding the quantum wells and also made of gallium nitride.

Each rod extends along a longitudinal axis 122 defining its height, the base 123 of each rod being disposed in a plane 124 of the upper face 116 of the substrate 110.

The electroluminescent rods 108 of the semiconductor light source advantageously have the same shape. Each of these rods is delimited by a terminal face 126 and by a circumferential face 128 that extends along the longitudinal axis. When the electroluminescent rods are doped and polarized, the resulting light at the exit of the semiconductor source is emitted primarily from the circumferential wall 128, it being understood that light rays may also, at least in small quantities, exit the terminal face 126. A result of this is that each rod acts like a single light-emitting diode and that the density of the electroluminescent rods 108 improves the light yield of this semiconductor source.

The circumferential wall 128 of a rod 108, corresponding to the gallium nitride shell, is covered by a transparent conductive oxide (TCO) layer 129 that forms the anode of each rod complementary to the cathode formed by the substrate. This circumferential wall 128 extends along the longitudinal axis 122 from the substrate 110 to the terminal face 126, the distance from the terminal face 126 to the upper face 116 of the substrate, from which the electroluminescent rods 108 arise, defining the height of each rod. By way of example, the height of an electroluminescent rod 108 is between 1 and 10 micrometres inclusive, while the largest transverse dimension of the terminal face, perpendicular to the longitudinal axis 122 of the electroluminescent rod concerned, is less than 2 micrometres. The surface area of a rod in a section plane perpendicular to this longitudinal axis 122 could equally be defined within a range of particular values, and in particular between 1.96 and 4 square micrometres.

It is clear that during the formation of the rods 108 the height may be modified from one portion to another of the same light source, in such a manner as to increase the brightness of some parts of the semiconductor light source, given that the brightness increases as the height of the rods is increased.

The shape of the electroluminescent rods 108 may also vary from one portion to another of the same light source, in particular with regard to the section of the rods and/or the shape of the terminal face 126. There are shown in FIG. 3 electroluminescent rods having a cylindrical general shape, in particular of polygonal section, here more particularly of hexagonal section. It is clear that it is important that light can be emitted through the circumferential wall, that the latter has a polygonal or circular shape, for example.

Figure 5:
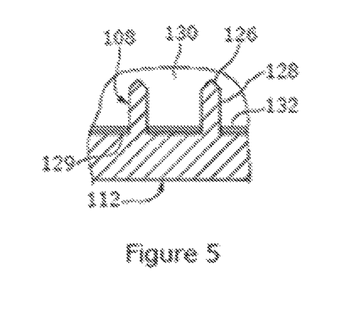
FIG. 5 is a view in section of a detail of a semiconductor light source according to one particular embodiment of the invention in which two electroluminescent rods project from a substrate, said electroluminescent rods being encapsulated in a protective layer.

Moreover, the terminal face 126 may have a substantially plane shape perpendicular to the circumferential wall with the result that it extends substantially parallel to the upper face 116 of the substrate 110, as shown in FIG. 3, or may have a convex shape or a pointed shape at its centre, in such a manner as to multiply the directions of emission of the light exiting this terminal face, as shown in FIG. 5.

Figure 4:
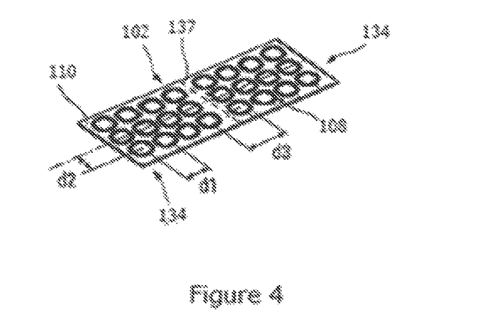
FIG. 4 is a diagrammatic illustration of the arrangement of electroluminescent rods on a light source according to the invention, here with two zones of electroluminescent rods that can be activated selectively.

In FIGS. 3 and 4, the electroluminescent rods 108 are arranged in a two-dimensional matrix, with rods aligned in mutually perpendicular rows and in columns. This arrangement could be such that the electroluminescent rods are arranged in a quincunx. The invention covers other distributions of the rods, in particular with rod densities that may vary in different portions of the same light source. There is shown diagrammatically in FIG. 4 the separation distance d1 of two immediately adjacent electroluminescent rods in a first transverse direction and the separation distance d2 of two immediately adjacent electroluminescent rods in a second transverse direction. The separation distances d1 and d2 are measured between two longitudinal axes 122 of adjacent electroluminescent rods. As stated above, the number of electroluminescent rods 108 projecting from the substrate 110 may vary from one portion to another of a light source, in particular to increase the luminous density of a portion of that light source, but it is accepted that one or the other of the separation distances d1, d2 must be at least equal to 2 micrometres, in order for the light emitted by the circumferential wall 128 of each electroluminescent rod 108 to be able to exit the matrix of rods. Moreover, these separation distances are not greater than 100 micrometres.

The light source may further include, as shown in FIG. 5 in particular, a layer 130 of a polymer material forming an encapsulation in which the electroluminescent rods 108 are at least partially embedded. The layer 130 can therefore extend over the whole extent of the substrate or only around a particular group of electroluminescent rods 108. The polymer material, which may in particular be based on silicone, makes it possible to protect the electroluminescent rods 108 without impeding the diffusion of the light rays.

The light source may further include a coating 132 of a material reflecting light that is disposed between the electroluminescent rods 108 to deflect rays initially oriented toward the substrate toward the terminal face 126 of the electroluminescent rods 108. In other words, the upper face 116 of the substrate 110 may include reflective means that redirect light rays initially oriented toward the upper face 116 toward the exit face of the light source. This recovers rays that would otherwise be lost. This coating 132 is disposed between the electroluminescent rods 108 on the transparent conductive oxide layer 129.

As mentioned above, the light source 102 is controlled by a control module 101. The control module comprises a calculation unit and a storage unit not shown in figures. The storage unit is configured to store at least a program for controlling the light source 102 and a program for controlling the light processing device 200. The calculation unit is configured to execute these programs simultaneously in such a manner as to correlate the operation of the light source 102 and the light processing device 200.

To this end, the control module 101 is configured to activate an emissive element 134 of the light source 102 selectively and the emissive element 134 may consist of a single electroluminescent rod or, as shown in FIG. 4, a plurality of electrically interconnected luminescent rods. In the latter case, the activation of an emissive element 134 consists in the simultaneous activation of all the rods 108 present in a zone delimited by lines 137 of demarcation by means of a single instruction from the control module 101. There is shown in FIG. 4 the separation distance d3 in the first transverse direction between a rod of a first emissive element 134 and a directly adjacent rod of a second emissive element. It is accepted that this separation distance d3 measured between two longitudinal axes of electroluminescent rods must be at least equal to 2 micrometres in order for the light emitted by the circumferential wall 128 of each rod 108 to be able to exit the matrix of electroluminescent rods, and the aim is to have a separation distance d3 between two rods of two different zones that is substantially equal to the separation distance d1 or d2 of two rods of the same zone of the light source. Each emissive element 134 demarcated in this way is configured to emit a directional light beam. When the or each rod 108 corresponding to an emissive element is extinguished, a dark zone appears on the emission surface of the light source 102.

Figure 6:
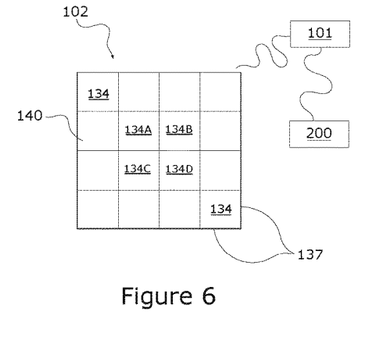
FIG. 6 is a front view of a matrix of emissive elements, each emissive element comprising one or more electroluminescent rods of the light source as represented in FIGS. 3 to 5.

The light source 102 may take a number of forms without departing from the context of the invention, provided that it features a plurality of emissive elements 134 that can be activated selectively and independently of one another by the control module 101. According to the present example shown in FIG. 6, the light source 102 has a substantially square shape comprising a multitude of identical emissive elements 134, i.e. including the same number of rods, separated by lines 137 of demarcation, arranged in rows and columns in such a manner as to form a homogeneous matrix 140 of emissive elements 134.

Figure 7:
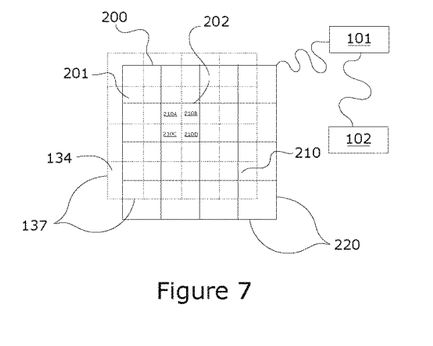
FIG. 7 is a front view illustrating the superposition of a matrix of active elements of a light processing device used in the lighting module shown in FIG. 1 and the projected image of the matrix of emissive elements from FIG. 6.

The light source is arranged in the lighting module 10 in such a manner as to illuminate the light processing device 200. According to the present example, the light processing device 200 is of the LCD (liquid crystal display) type configured to transmit a light beam forming a pixelized image. To this end, as shown in FIG. 7, the light processing device 200 includes a matrix 201 of active elements 202, each active element corresponding to a block of liquid crystals forming an active zone. Each active element 202 is adapted to assume an active position in which it is able to transmit light emitted by the light source 102 in the direction of the shaping first optic 106 and a passive position in which is able to block light emitted by the light source 102. Each active element 202 can be activated or deactivated independently of the others by the control module 101.

According to the invention, the light source 102 and the light processing device 200 are arranged relative to one another in the lighting module 10 so that their respective matrices of emissive elements and active elements are offset in such a manner that only some of the rays emitted by an emissive element encounter an active element and, where appropriate, the rays emitted by each emissive element 134 participate in illuminating a plurality of active elements 202, here four of them. To be more precise, the light source 102 is positioned facing the matrix 201 so that each emissive element 134 projects a light beam illuminating only some of four adjacent active elements 202. Accordingly, as shown in FIG. 7, the emissive elements 134 placed behind the matrix 201 and represented in dashed line are arranged and configured so that the image projected by each emissive element illuminates a zone 210 of the matrix 201 delimited by lines 220 of demarcation. Each zone 210 overlaps at least a portion of an active element 202 delimited by lines 220 of demarcation represented in solid line. For example, the active element 202 indicated in FIG. 7 is divided into four zones 210A, 210B, 210C and 210D, each zone corresponding to a portion of the projection surface area of a light beam emitted by a distinct emissive element as explained hereinafter. In other words, as shown in FIG. 7, the matrices of the emissive elements 134 and the active elements 202 are arranged face-to-face so that the projection of the lines 137 of demarcation of the active elements 134 on the matrix 200 of active elements is not superposed on the lines 220 of demarcation of the active elements 202 that constitute it.

According to the present example, the zones 210 are the same shape and have the same dimensions as the active elements 201. Of course, it could be different in another embodiment of the invention.

FIGS. 7A to 7D now show an example of the operation of a lighting module 10 according to the invention, to be more precise the operation of an active element 202 illuminated by four adjacent emissive elements. In order to facilitate the understanding of the invention, only one active element 202 is represented, placed in front of the projected image of four emissive elements 134A to 134D. Of course, this active element is in theory surrounded by other active elements in order to form the matrix 201 of active elements shown in FIG. 7.

When the control module 101 activates the four adjacent emissive elements 134A to 134D, each of the latter illuminates a respective one of four distinct zones 210A to 210D of the same active element 202.

Figure 7A:
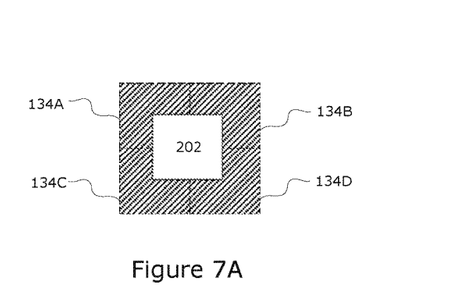
FIG. 7A is a front view of a deactivated active element of the matrix of active elements positioned in front of the image of four elements of the emission matrix that are activated.
Figure 7B:
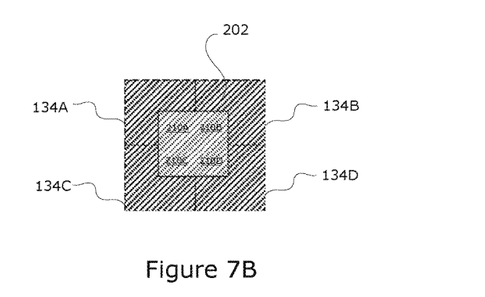
FIG. 7B is a front view of an activated active element of the matrix of active elements positioned in front of the image of four elements of the emission matrix that are activated.
Figure 7C:
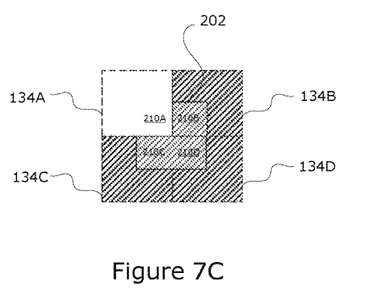
FIG. 7C is a front view of an activated active element of the matrix of active elements positioned in front of the image of three elements of the emission matrix that are activated and the image of an element of the emission matrix that is deactivated.
Figure 7D:
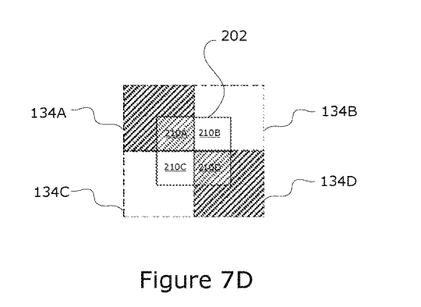
FIG. 7D is a front view of an activated element of the matrix of active elements positioned in front of the image of two elements of the emission matrix that are activated and the image of an element of the emission matrix that is deactivated.

Note that in FIGS. 7A to 7D light is represented by shaded areas. When the control module deactivates this active element 202, no light emitted by these emissive elements is transmitted by the active element 202 to the first shaping optic 106. In other words, and as shown in FIG. 7A, the active element 202, which crosses a portion of the image projected by each of the four emissive elements, conceals a portion of the light from each of these four emissive elements. Because of this, the image projected by the lighting module 10 includes a dark zone corresponding to the active element 202. Conversely, as shown in FIG. 7B, when the control module activates the active element 202, some of the light beams emitted by the emissive elements 134A to 134D is transmitted by the lighting module 10. The aforementioned dark zone then becomes light. Now, as shown in FIG. 7C, the control module 101 deactivates the emissive element 134A. The zone 210A of the active element 202 is therefore no longer illuminated, which is reflected in the appearance in the light zone of a black mark corresponding to a pixel of the pixelized image. This dark zone can be enlarged in a longitudinal transverse direction by the control module 101 by deactivating the emissive element 134B or 134C, with the result that the zone 210B or 210C of the active element 202 is also no longer illuminated. According to an alternative shown in FIG. 7D, the control module can activate only the emissive elements 134A and 134D in such a manner as to illuminate only the zones 210A and 210D of the active element 202 in such a manner as to form a pixelized image comprising four distinct pixels, of which two are light and two are dark.

It is therefore clear from the above example that the invention enables selective and independent modification of four pixels of a pixelized image without this necessitating the control module 101 to activate an active element 202. Because of this, thanks to the invention, the formation of a pixel in a pixelized image no longer necessitates the activation of a specifically corresponding active element 202. Actually, by activating only one active element 202, it is possible to form one or more pixels by activating one or more emissive elements 134 illuminating said active element 202. Accordingly, compared to the prior art device described above, for identical image resolution, the invention advantageously enables use of fewer active elements 202 and as described this makes it possible to obtain less costly devices and/or devices for which the risk of failure of these active elements is reduced.

There is shown in FIG. 2 a processing device 200 that is arranged at a distance from the light source and configured to have pass through it the rays emitted by that light source. According to a variant embodiment that is not shown, the light source 102 can adjoin the matrix of active elements in order to reduce the overall size of the lighting module 10.

Figure 8:
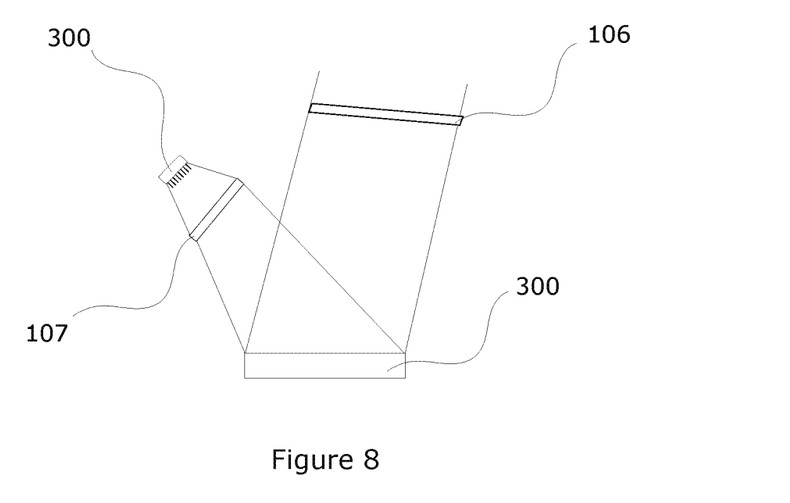
FIG. 8 is a diagrammatic representation of a lighting module according to a second embodiment of the invention.

A second embodiment of the invention is described next with reference to FIG. 8, in which the light processing device 300 is of the DMD (digital mirror device) type configured to project a light beam forming a pixelized image and therefore differing from the processing device of the first embodiment in that it has properties to reflect rays toward the first shaping optic 106 instead of the refractive properties of the first embodiment. In fact, according to this second embodiment, the light source is positioned relative to the light processing device, on the same side as the first optic 106, whereas in the first embodiment the light source and the first shaping optic 106 are disposed on respective opposite sides of the light processing device.

In this second embodiment, the light processing device 300 includes a matrix 301 of active elements 302, each active element corresponding to a mobile micromirror. Each micromirror is mounted to pivot about an axis between an active position in which the micromirror reflects light emitted by the light source 102 in the direction of the first shaping optic 106 and a passive position in which the micromirror reflects said light in the direction of a luminous radiation absorber element that is not shown in the figures. The rotation of each micromirror can be controlled independently of the others by the control module 101. In the example shown, which is however not limiting on the invention, the matrix of active elements 301 is of square shape and delimited by 500 to 1500 micromirrors or active elements 302 on each of its sides, and each micromirror has a size of the order of 7 to 10 micrometres.

Figure 9:
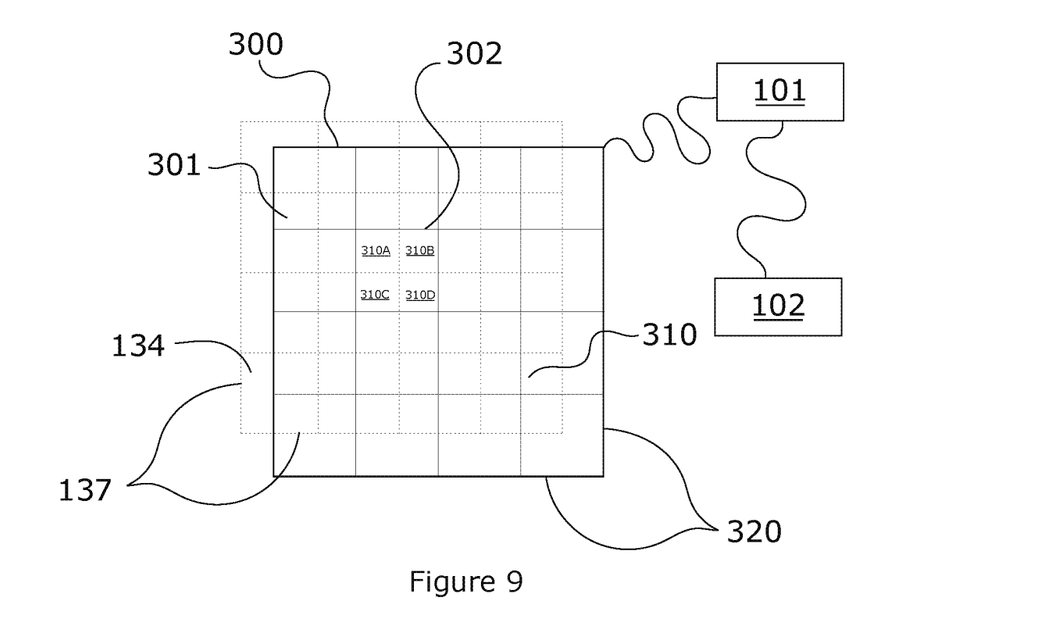
FIG. 9 is a view illustrating the superposition of a matrix of active elements of a light processing device used in the lighting module shown in FIG. 8 and the projected image of a matrix of emissive elements of the light source used in this lighting module from FIG. 8.

According to the invention, the light source 102 is arranged in the lighting module 10 in such a manner that the emissive elements 134 that constitute it can be selectively activated and at least one emissive element 134 of the light source, i.e. a rod or a set of electrically interconnected rods, illuminates a plurality of micromirrors 301, here four of them. To be more precise, the light source 102 is positioned relative to the matrix 301 of active elements 302 so that each emissive element 134 projects a light beam of which only a portion illuminates a micromirror and/or the global beam of which illuminates only a portion of four micromirrors.

In this second embodiment the control of the emissive elements and the active elements is the same as that described for the first embodiment, in particular with reference to FIGS. 7A to 7D, with the result that the teachings previously referred to can now be applied to control the rotation of the micromirrors from a first position to the other position instead of controlling the activation or the deactivation of the liquid crystals.

According to what has been described above, thanks to the invention, the formation of a pixel in a pixelized image in this second embodiment no longer necessitates the activation of a specifically corresponding micromirror. In fact, by activating a micromirror, it is possible to form one or more pixels by activating one or more emissive elements 134 illuminating that micromirror 302. Accordingly, compared to the prior art device described above, for identical image resolution, the invention advantageously enables use of fewer micromirrors which, as described, makes it possible to obtain devices that are less costly and/or for which the risk of failure of the active elements is reduced.

The lighting module may comprise a second shaping optic 107 positioned between the light source 102 and the light processing device 300. The purpose of the second optic 107 is to extend the projection surface area of the light beam and where appropriate to deflect the beam emitted by the light source so that the light source 102 can illuminate all of the matrix of active elements when its dimensions are less than those of the matrix 301 of active elements 302. In other words, the second optic 107 is configured to affect either a homothetic enlargement if the aspect ratio of the sources and the active elements is identical or an anamorphosis if this is not the case.

The invention claimed is:

1. Lighting device for a motor vehicle, configured to project a light beam forming a pixelized image, comprising
a light source and a light transmitting processing device for processing the light emitted by the light source, the light transmitting processing device including a matrix of active elements configured to be activated or be deactivated to transmit or not transmit, respectively, at least a portion of the light beam emitted by the light source to a receiving side of the active elements in such a manner as to form the pixelized image at the output side of the active elements opposite of the receiving side,
wherein the light source includes a matrix of emissive elements of which at least two emissive elements are activated selectively,
wherein the matrix of emissive elements and the matrix of active elements are offset relative to one another in such a manner that each active element is arranged across a portion of the light beam emitted by an emissive element, and
wherein at least one active element passes through to the output side a portion of the light beam emitted by an emissive element and at least one active element conceals a portion of the light beam emitted by an emissive element to project the pixelized image outside the lighting device.

2. Motor vehicle lighting device according to claim 1, wherein each emissive element is configured to light at least two adjacent active elements.

3. Motor vehicle lighting device according to claim 2, wherein surface area of the matrix of emissive elements is greater than surface area of the matrix of active elements.

4. Motor vehicle lighting device according to claim 2, wherein surface area of at least one emissive element is equal to surface area of at least one active element.

5. Motor vehicle lighting device according to claim 2, wherein surface area projected onto the light transmitting processing device, of a light beam emitted by an emissive element is equal to surface area of at least one active element.

6. Motor vehicle lighting device according to claim 2, wherein the lighting device comprises a first projection optic arranged facing the output of the matrix of active elements, in such a manner as to project the pixelized image outside the lighting device.

7. Motor vehicle lighting device according to claim 2, wherein at least one active element reflects a portion of the light beam emitted by an emissive element.

8. Motor vehicle lighting device according to claim 2, wherein at least one active element is configured to refract a portion of the light beam emitted by an emissive element.

9. Motor vehicle lighting device according to claim 2, wherein the lighting device comprises a second projection optic arranged between the light source and the light transmitting processing device, in such a manner as to project onto the matrix of active elements at least a portion of the light emitted by the light source.

10. Motor vehicle lighting device according to claim 1, wherein surface area of the matrix of emissive elements is greater than surface area of the matrix of active elements.

11. Motor vehicle lighting device according to claim 1, wherein surface area of at least one emissive element is equal to surface area of at least one active element.

12. Motor vehicle lighting device according to claim 1, wherein surface area projected onto the light transmitting processing device, of a light beam emitted by an emissive element is equal to surface area of at least one active element.

13. Motor vehicle lighting device according to claim 1, wherein the lighting device comprises a first projection optic arranged facing the output of the matrix of active elements, in such a manner as to project the pixelized image outside the lighting device.

14. Motor vehicle lighting device according to claim 1, wherein at least one active element reflects a portion of the light beam emitted by an emissive element.

15. Motor vehicle lighting device according to claim 1, wherein at least one active element is configured to refract a portion of the light beam emitted by an emissive element.

16. Motor vehicle lighting device according to claim 1, wherein the lighting device comprises a second projection optic arranged between the light source and the light transmitting processing device, in such a manner as to project onto the matrix of active elements at least a portion of the light emitted by the light source.

17. Motor vehicle lighting device according to claim 1, wherein the lighting device comprises a control device configured to control simultaneously the lighting and/or the extinction of the emissive elements and to activate and/or deactivate the active elements of the processing device.

18. Motor vehicle lighting device according to claim 1, wherein each emissive element comprises a plurality of submillimetre electroluminescent rods for emitting a light beam.

19. Motor vehicle lighting device according to claim 18, wherein the electroluminescent rods project from a substrate, and is formed directly on that substrate.

20. Motor vehicle lighting device including a lighting device according to claim 1.

* * * * *